United States Patent [19]

Giroux

[11] Patent Number: 4,954,019

[45] Date of Patent: Sep. 4, 1990

[54] METHOD AND APPARATUS FOR LINING A CANAL

[76] Inventor: D. William Giroux, 694 Umpqua Pl., LaConner, Wash. 98257

[21] Appl. No.: 395,811

[22] Filed: Aug. 18, 1989

[51] Int. Cl.⁵ .............................................. E02B 5/02
[52] U.S. Cl. ..................................... 405/268; 405/38; 405/270; 404/100
[58] Field of Search ................. 405/268, 270, 258, 38; 404/100, 101, 96

[56] References Cited

U.S. PATENT DOCUMENTS

| | | | |
|---|---|---|---|
| 2,094,974 | 10/1937 | Wood | 405/268 |
| 2,308,294 | 1/1943 | McCorkle et al. | 405/270 |
| 2,333,287 | 11/1943 | Baird | 405/268 X |
| 2,444,811 | 7/1948 | Crom | 405/268 |
| 2,975,602 | 3/1961 | Stromberg | 405/268 |
| 3,182,459 | 5/1965 | Grether et al. | 405/270 X |
| 4,050,972 | 9/1977 | Cardinal | 405/270 X |
| 4,557,633 | 12/1985 | Dyck | 404/100 X |
| 4,720,212 | 1/1988 | Steenbergen et al. | 405/38 X |
| 4,828,432 | 5/1989 | Ives | 405/270 |

FOREIGN PATENT DOCUMENTS

| | | | |
|---|---|---|---|
| 1170035 | 7/1985 | U.S.S.R. | 405/268 |
| 1170036 | 7/1985 | U.S.S.R. | 405/268 |

*Primary Examiner*—Dennis L. Taylor
*Attorney, Agent, or Firm*—Zarley, McKee, Thomte, Voorhees & Sease

[57] ABSTRACT

An apparatus for lining a canal is described as well as the method for lining the canal. The apparatus comprises an elongated frame which extends transversely across the canal and which is propelled the length thereof. A concrete paver is supported on the frame and is designed to lay concrete on one of the sides of the canal and at least a portion of the bottom of the canal as the frame is moved along the length of the canal. A flexible sheet material is positioned on the canal sides and bottom just prior to the concrete being positioned thereon. The PVC is positioned on the canal in a substantially wrinkle-free and untensioned condition. The method of lining the canal is also described.

23 Claims, 16 Drawing Sheets

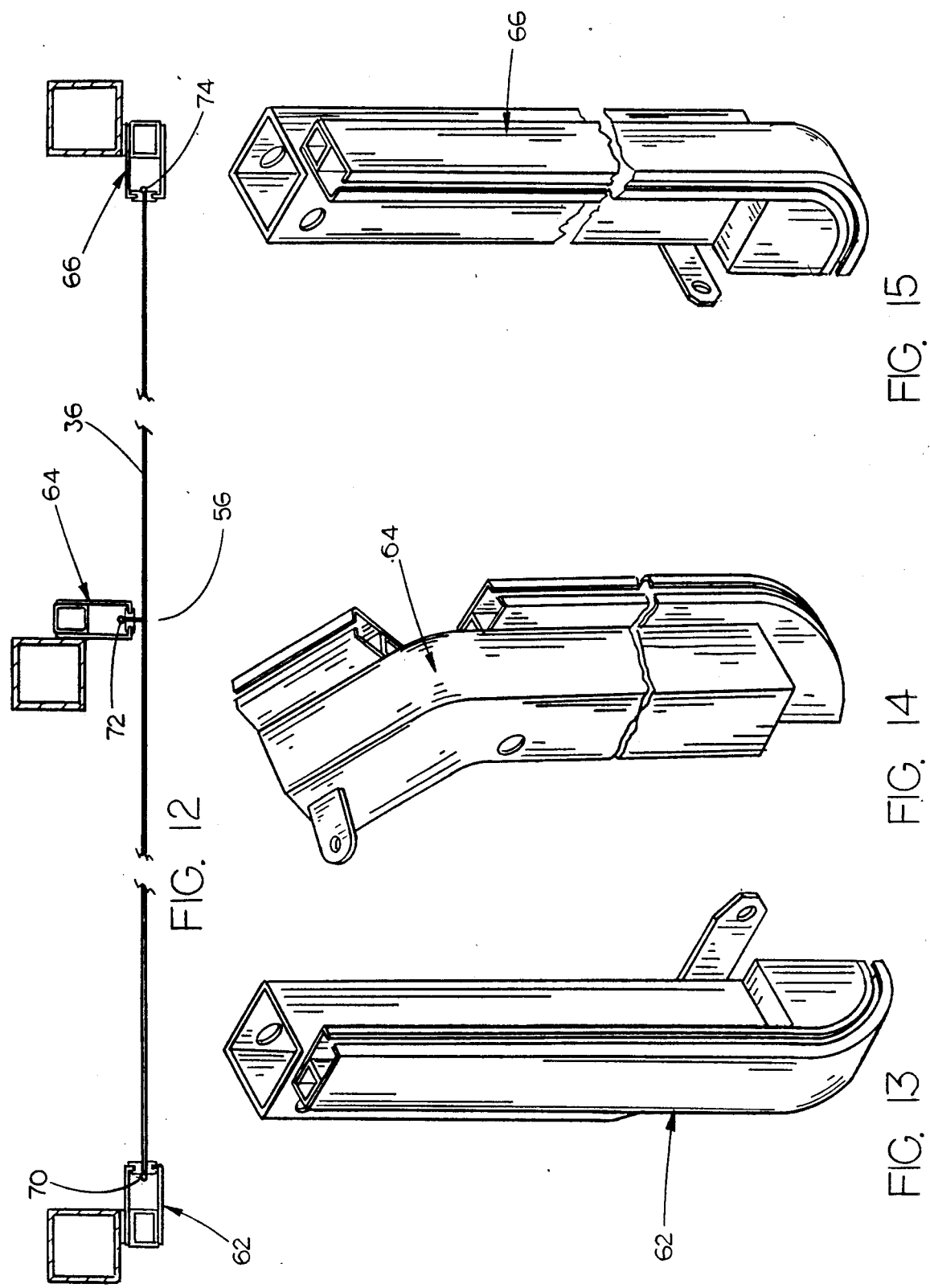

METHOD AND APPARATUS FOR LINING A CANAL

TECHNICAL FIELD

The present invention relates generally to a method and apparatus for lining a canal with a water-impervious layer of material, and a concrete layer atop the impervious layer and more particularly to a method and apparatus for lining a canal which has water flowing therein.

BACKGROUND OF THE INVENTION

Many of the older irrigation canals are forced with a compacted silt bottom and sloped sides and are prone to leakage. In some locations, a canal may run through extreme porous material, where serious leakage is of yet greater concern.

One method for repairing such leaking canals is to install an impermeable lining in the canal. However, heretofore this was not possible while water continued to flow in the canal. Thus the water would have to be diverted or retained while the lining was installed which means that some areas will be without water during the lining process.

The other known method for correcting the problem was to construct a new lined canal to replace the old leaking canal. Clearly, this alternative is expensive and impractical since right-of-way land may not be available to build a new canal.

It is therefore a general object of the present invention to provide an apparatus and method for lining a canal with an impermeable material, while water flows within the canal.

Another object is to provide a method and apparatus for lining a canal which will not significantly block the flow of water in the canal.

A further object is to provide a method of lining a canal with PVC or other impervious membrane material being positioned in a non-stressed condition on the bottom and sloping sides of the canal.

Still another object of the present invention is to provide a method and apparatus for laying PVC or the like in a canal which will lay the PVC or the like in a substantially wrinkle-free state.

Still a further object is to provide a method and apparatus for laying a layer of concrete on a PVC layer or the like in the bottom of a canal.

Yet another object of the present invention is to provide a method and apparatus for lining a canal which may be continuously operated while the canal is flowing.

These and other objects of the present invention will be apparent to those skilled in the art.

SUMMARY OF THE INVENTION

The method and means is described for lining an irrigation canal while water is flowing in the canal. The apparatus comprises an elongated frame means which extends transversely across the canal and which has propelling track members at the opposite ends thereof to propel the frame means along the length of the canal. Supported on the frame means is a concrete laying mechanism which is designed to lay concrete on one of the sides of the canal and at least a portion of the bottom of the canal as the frame means is moved along the length of the canal. Prior to the concrete being placed in the canal, a flexible sheet material is positioned on the canal with the concrete being placed thereon. Means is provided on the frame means for laying the sheet material in the canal in a substantially wrinkle-free condition and in a substantially untensioned condition. Pivotably movable current dam members are provided around the concrete laying apparatus and the sheet material laying apparatus to shield the same from water current in the canal.

BRIEF DESCRIPTION OF THE DRAWINGS

FIG. 12 is a top view of the guides and their relationship to the sheet material;

FIG. 13 is a partial perspective view of the lower end of the outermost guide for the sheet material;

FIG. 14 is a partial perspective view of the intermediate guide member;

FIG. 15 is a partial perspective view of the lower end of the innermost guide member;

DESCRIPTION OF THE PREFERRED EMBODIMENT

Figure 1:
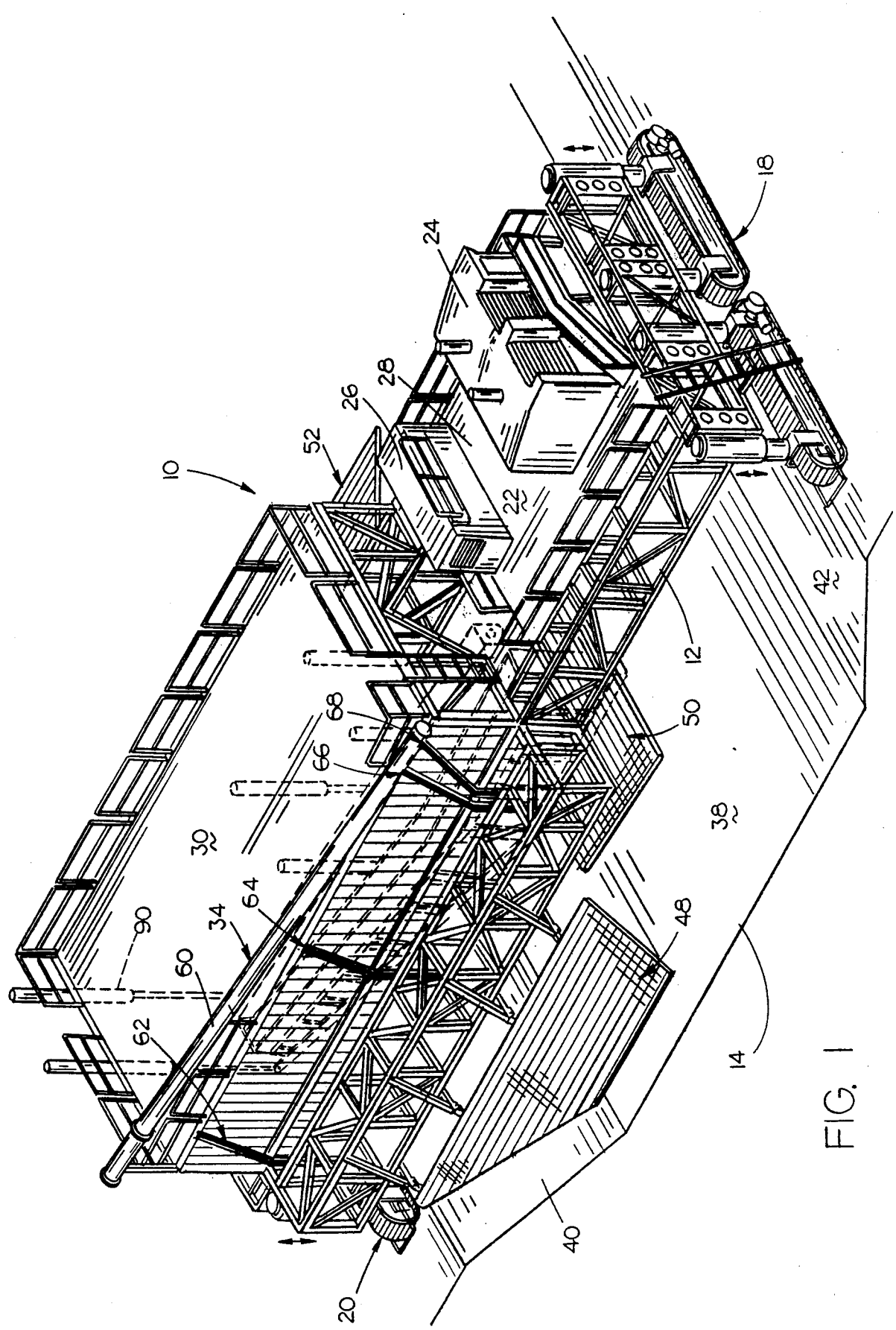
FIG. 1 is a perspective view of the forward side of the canal-lining apparatus of the present invention in position over a canal.

Referring now to the drawings, especially FIG. 1, in which similar or corresponding parts are identified with the same reference numeral, the canal-lining apparatus of the present invention is designated generally at 10, and includes an elongated frame means 12 extending transversely across a canal 14 having water 16 flowing therein, and having driven tracks 18 and 20 at the end thereof for moving frame means 12 along the canal 14. Conventional hydraulic cylinders interconnect the frame means 12 and the tracks 18 and 20 to permit frame means 12 to be raised and lowered with respect to the tracks 18 and 20. A floor 22 is mounted on the top of frame means 12 adjacent one end thereof and supports a power source such as a diesel engine(s) 24 and control console 26 defining an operators station 28 therebetween. An elevated floor 30 is positioned above floor 22 at the other end of frame means 12 for supporting a supply 32 of lining or sheet material 36 thereon as will be described in greater detail hereinafter. Although the lining material is described as PVC, other types of impervious membrane material may be utilized.

A PVC placement assembly is designated generally at 34 and will lay a layer of PVC 36, from the supply 32, uniformly along slightly more than approximately one-half of the bottom 38 and one slope 40 of canal 14. In a second pass in the opposite direction, the PVC placement assembly 34 will line the remaining one-half of bottom 38 and opposing slope 42, as described in more detail hereinbelow. The PVC placement assembly is provided to lay sheet material 36 in the canal in a substantially wrinkle-free and untensioned condition.

A vertically movable concrete paving assembly is designated generally at 44 and follows the PVC placement assembly 34 so as to lay a layer of concrete 46 on top of the previously placed layer of PVC 36.

Finally, hinged water or current dams 48, 50 and 52 hang like curtains forwardly of, at one side of, and rearwardly of the concrete paving assembly 44, so as to protect the PVC and concrete from the force of water current. The concrete paving assembly 44 is operated from operator's station 28, so as to continuously line approximately one-half of the canal 14.

Figure 2:
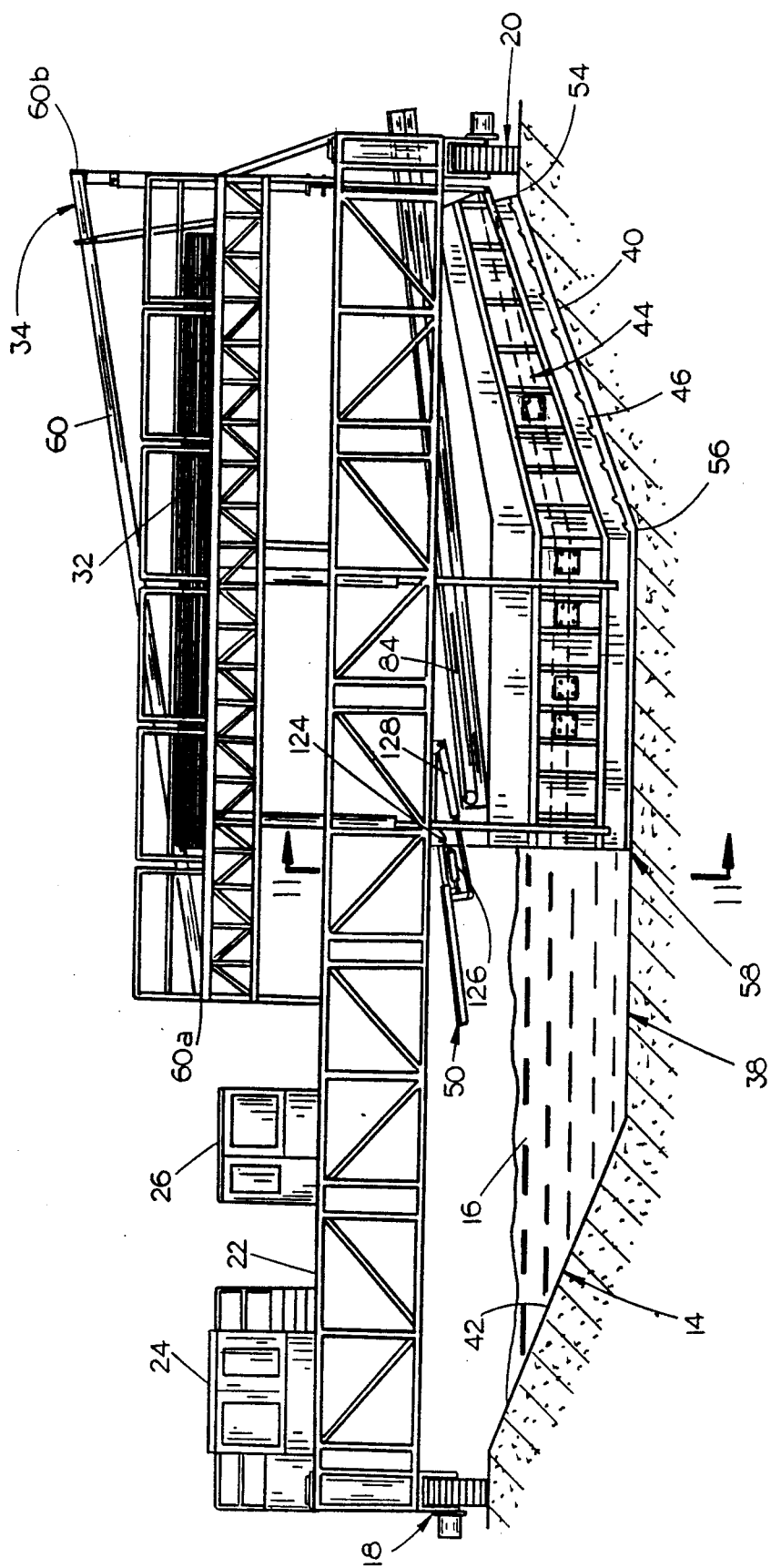
FIG. 2 is an elevational view of the rearward side of the canal-lining apparatus and which illustrates the lateral dam member in its raised position.

Referring now more specifically to FIG. 2, the forward and rearward current dams 48 and 52 have been removed or cut away so as to more clearly view the PVC placement assembly 34. There are three critical points in canal 14 which must be considered when laying the PVC layer. The first point to be considered is identified generally at 54 and is located along the upper edge of slope 40 where one longitudinal edge of the PVC will be located. A second critical point is indicated generally at 56, where slope 40 meets bottom 38 of canal 14. Finally, the third critical point is indicated generally at 58, near the center of canal bottom 38, where the opposite longitudinal edge of PVC 36 will be located.

In order to lay the PVC 36 in a substantially unstressed and wrinkle-free condition, without stretching or tension, the inventor has determined that every unit of the PVC, along a transverse line on the PVC sheet, must travel the same distance from the PVC stack or supply 32 to the placement point on the canal bottom or slope. Since the vertical distance from point 54 to the PVC stack is less than the vertical distance from points 56 and 58, this length difference must be compensated for so as to obtain an identical travel distance for all points along the PVC transverse line. In order to increase the distance which the outer edge of the PVC must travel to reach point 54, so as to be equal to the distance which the PVC will travel to points 56 and 58, a guide bar 60 is mounted on frame means 12 forwardly of the PVC stack 32 and with its longitudinal axis sloped upwardly from its interior end 60a, located near the center of frame means 12, to its exterior end 60b, located adjacent track 20 at the end of frame means 12. As can be seen in the drawings, the PVC material extends upwardly over guide bar 60 and then downwardly to the canal floor. Because guide bar 60 is sloped, the distance which the longitudinal outer edge of PVC 36 must travel has been increased with respect to the distance which inner edge must now travel because of the increased height at exterior end 60b of guide bar 60. A PVC guide 62 is provided to position the outer edge of the PVC 36 as will be described hereinafter.

It can be seen that the sloped position of guide bar 60 also increases the travel distance of a unit of the PVC located near the center of the sheet from the PVC stack to its placement points 56 and 58 on the bottom of the canal. For this reason, three PVC guides 64, 66 and 68 are provided which project downwardly from floor 30 and extend downwardly adjacent the canal bottom. Thus, the lower end of the first PVC guide 62 is located adjacent point 54 above the slope 40 of canal 14. The lower end of the second PVC guide 64 is located adjacent point 56 above the junction of slope 40 and bottom 38 of canal 14. The lower end of PVC guide 66 is located adjacent point 58 above the bottom 38 of canal 14. The lower end of PVC guide 68 is positioned laterally of the lower end of guide 66.

A plurality of ropes, as shown in FIG. 12, are affixed longitudinally on the PVC layer 36, with one rope 70 being affixed to the outer edge, one rope 72 being generally centered longitudinally on the PVC, and a third rope 74 being affixed along the inner edge. The PVC guides 62, 64 and 66 (or 68) are adopted to receive the ropes 70, 72 and 74 therein respectively, to assist in guiding the PVC sheet to its placement on the canal bottom. The PVC guides 62, 64 and 66 (or 68) will prevent edge creep of the PVC and assure edge alignment of the PVC after it leaves the stack up to the point of insertion under the concrete slab.

It should be noted that the PVC guides 62, 64 and 66 extend downwardly as viewed from the left of FIG. 1, at an angle of approximately 12°. PVC guide 68 extends vertically downwardly from its upper end. The lower end of guide 62 is positioned in the same vertical plane as the upper end thereof as viewed from the right in FIG. 1. The lower end of guide 64 is positioned behind, or trails, the upper end thereof by approximately 22°. The lower ends of guides 66 and 68 are positioned in the same vertical planes as the upper ends thereof respectively.

Guide 68 is utilized when the first one-half of the canal is being lined so that a wider sheet of PVC may be utilized to cover or line slightly more than one-half the bottom of the canal. On the return pass, guide 66 is utilized and guide 68 is not utilized.

Figure 3:
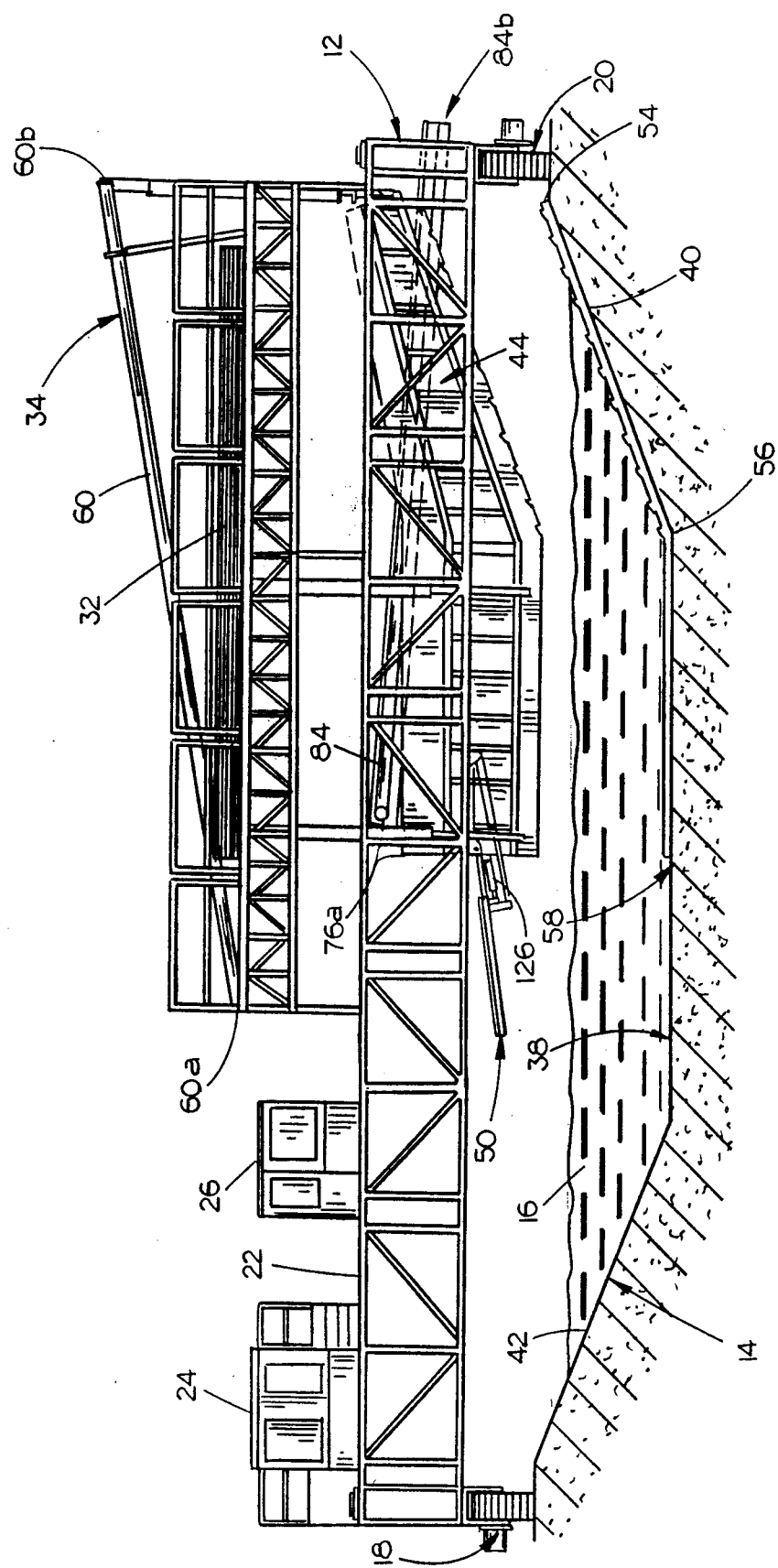
FIG. 3 is a view similar to FIG. 2 except that the concrete laying apparatus has been raised upwardly out of the canal.
Figure 4:
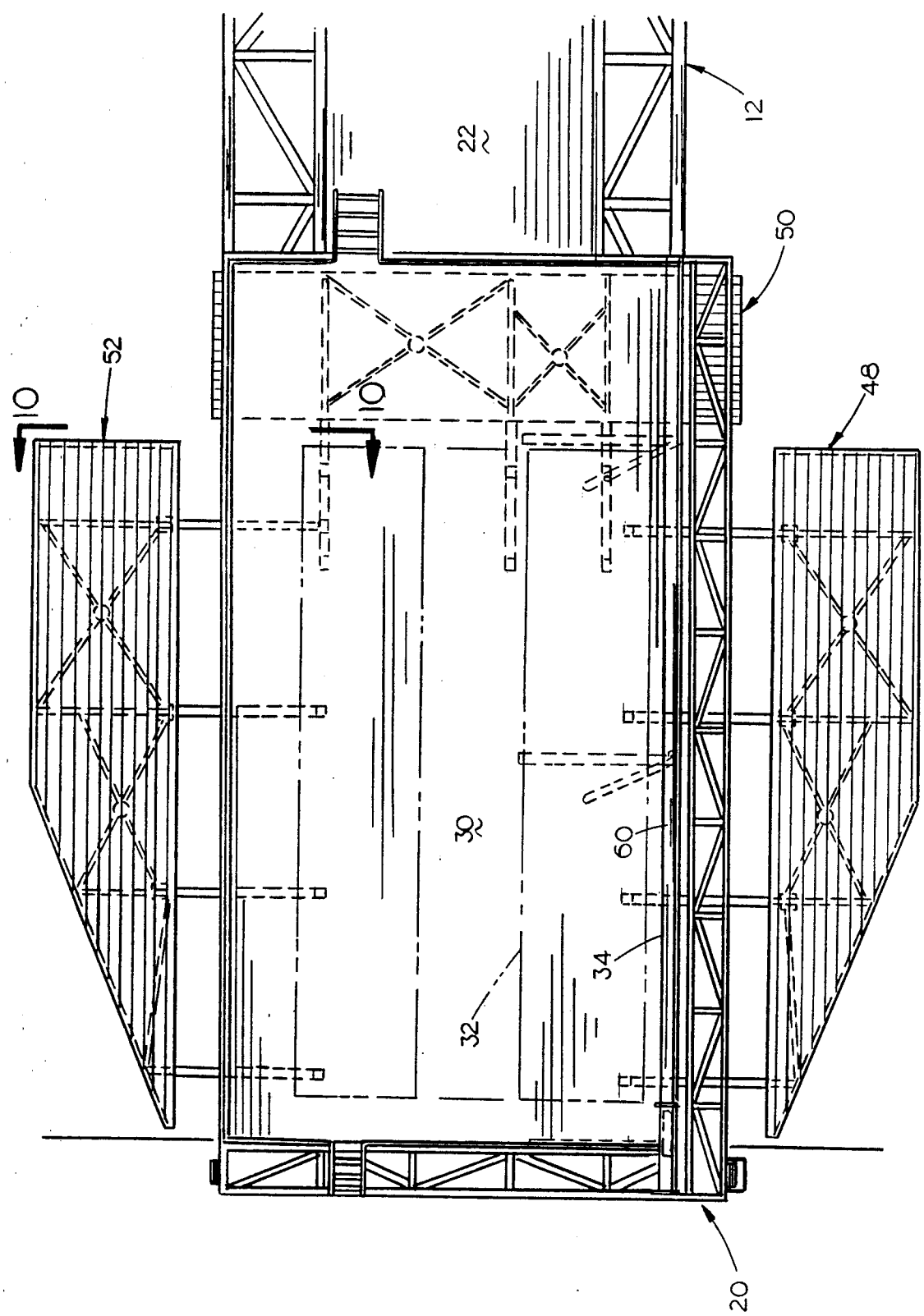
FIG. 4 is a top elevational view of the apparatus of this invention with the dam members in their raised condition.
Figure 5:
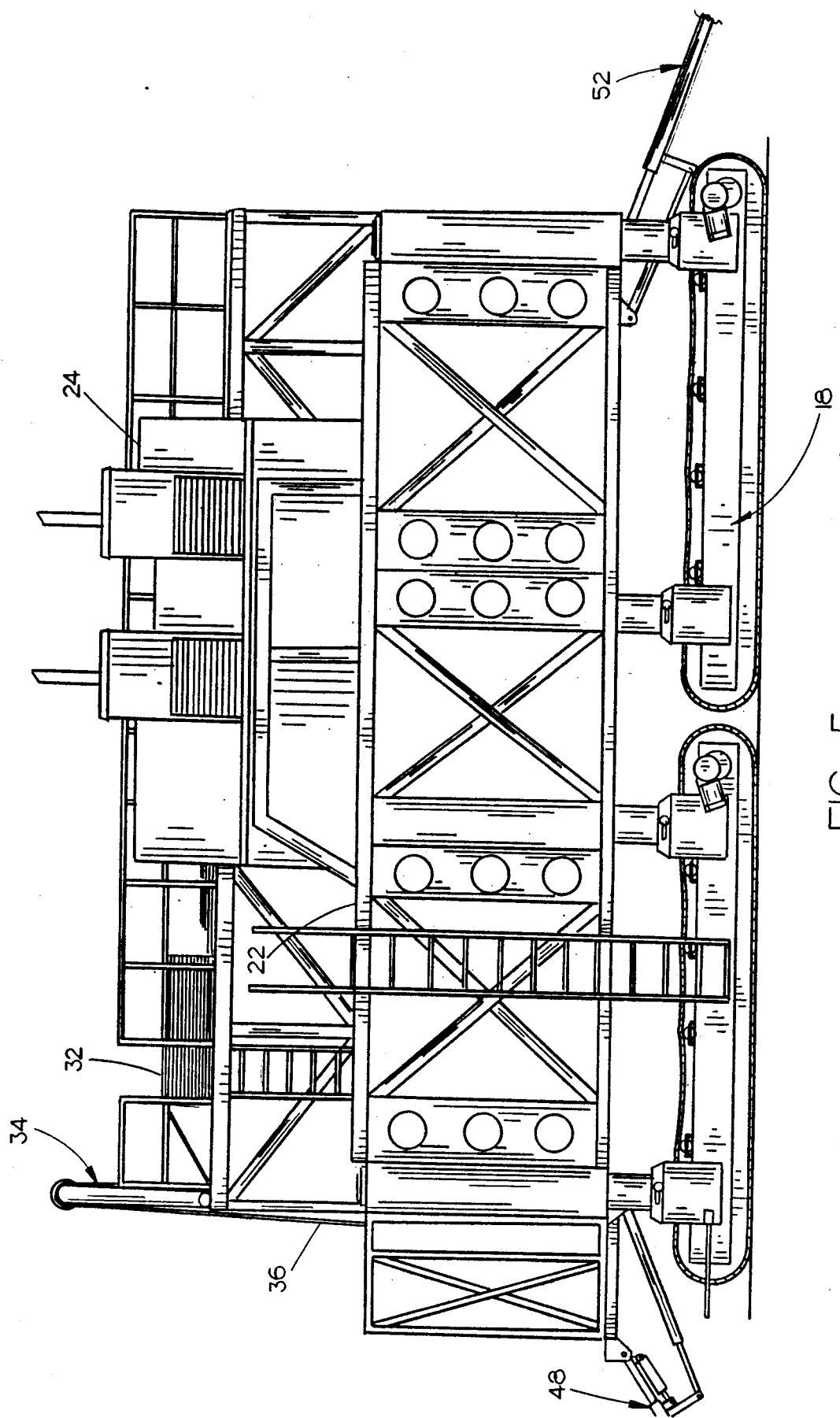
FIG. 5 is an end view of the apparatus as seen from the left side of FIGS. 2 and 3
Figures 8, 9:
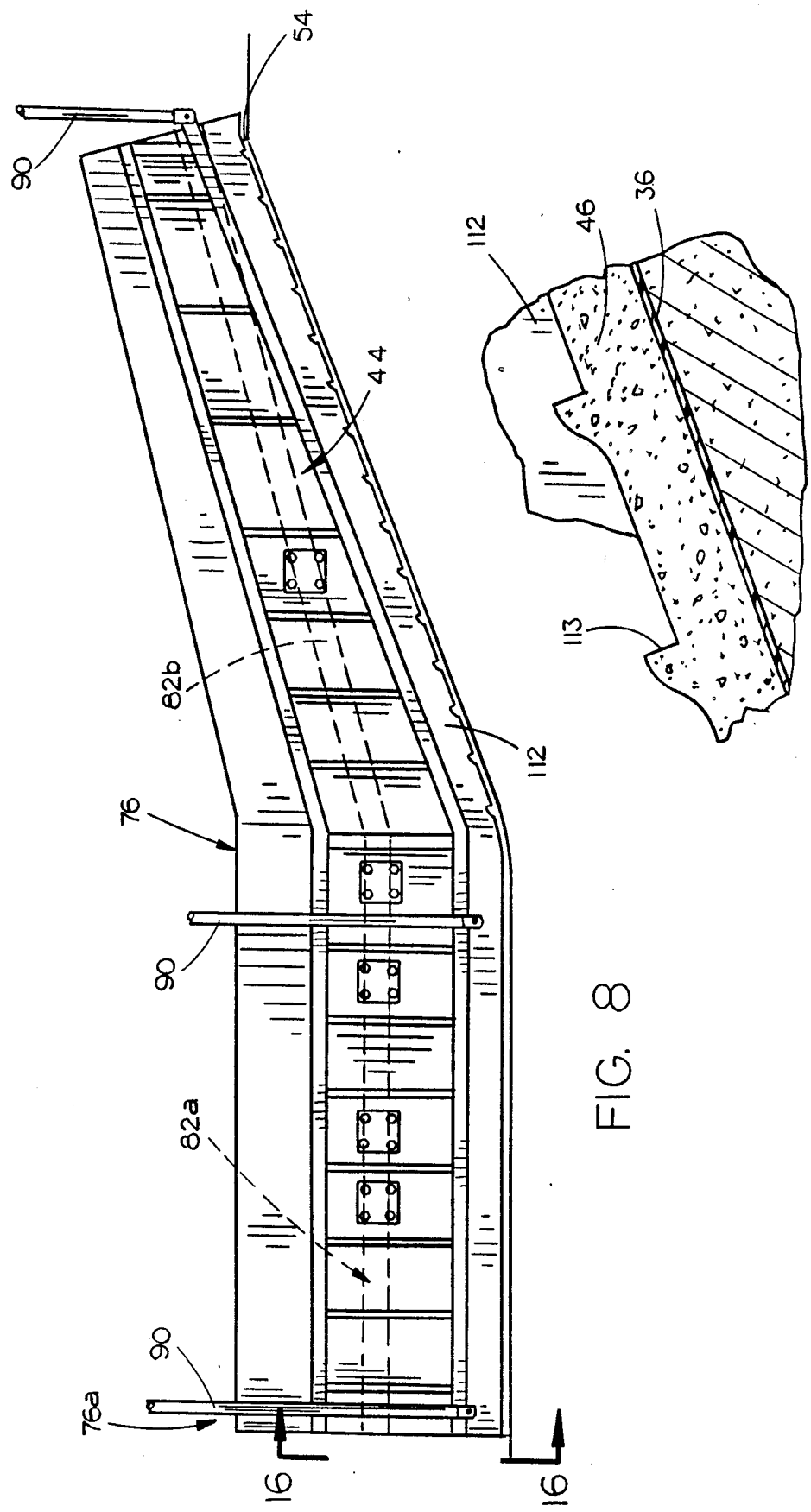
FIG. 8 is a partial rear view of the concrete laying apparatus of the invention.
FIG. 9 is a partial sectional view illustrating the concrete and sheet material which has been positioned on one of the canal sides.
Figure 11:
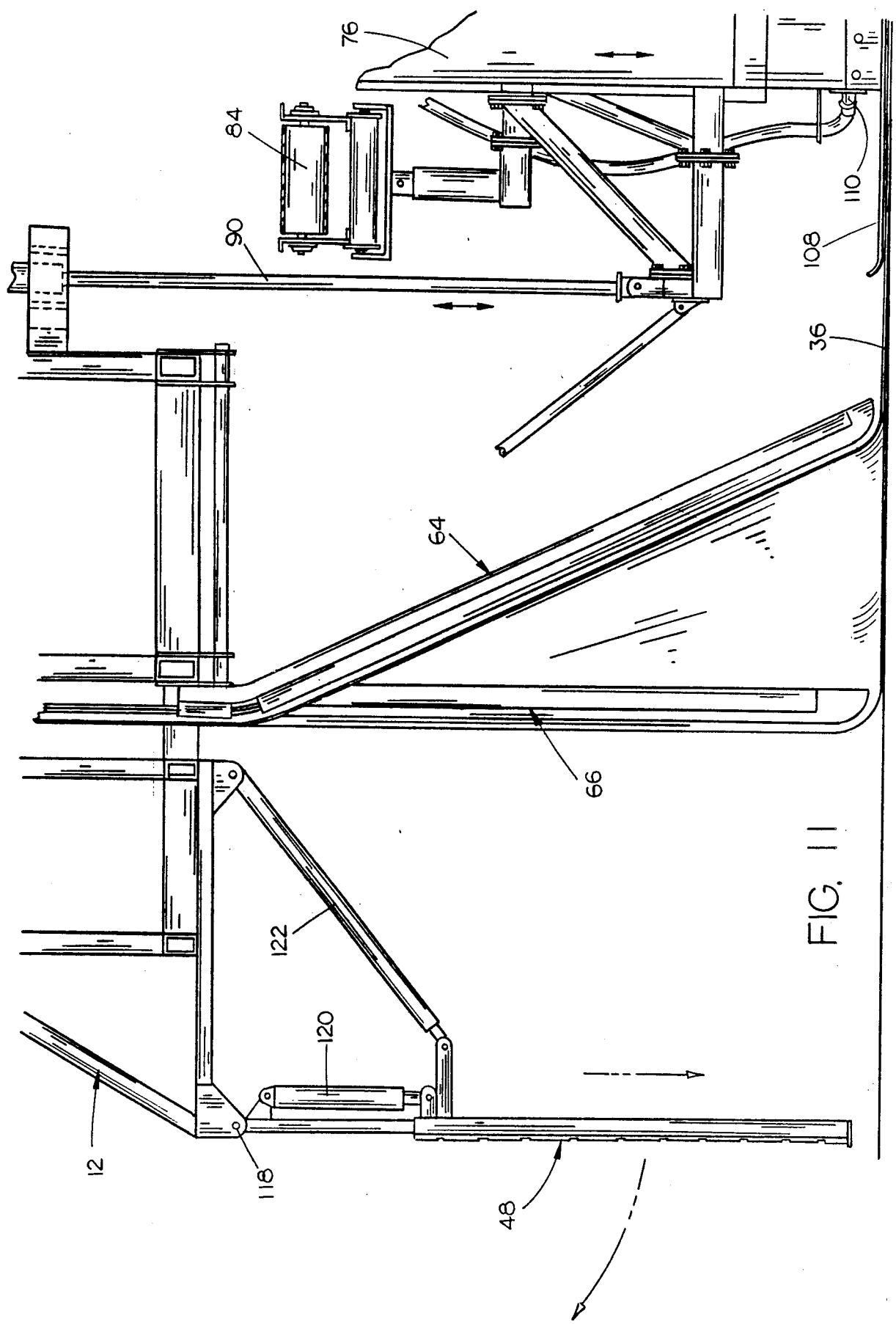
FIG. 11 is a partial sectional view seen on lines 11—11 of FIG. 2.

It can be seen that the actual point of placement of the PVC on the canal bottom will occur just forwardly of the location that concrete is poured on top of the PVC (see FIG. 11). The concrete paving assembly 44 is best seen in FIGS. 7, 8, 16 and 17 and includes a hopper portion 76 formed with forward wall 78 and rearward wall 80 and having a first end adjacent the center of the canal and a second end above the top end of slope 40. The bottom edges of forward and rearward walls 78 and 80 follow the conformation of the canal bottom, and thus slope upwardly adjacent slope 40 of the canal. A series of vertical baffles are provided between forward and rearward walls 78 and 80 to maintain the concrete in the desired position, within the hopper portion 76 above slope 40 and bottom 38. Auger 82 extends along the entire length of hopper portion 76 and is operated to move concrete as required on the horizontal section and upwardly into the sloped portion of the hopper. Auger 82 is comprised of auger portions 82a and 82. Auger 82 is utilized to maintain an appropriate head on the concrete within the hopper. The longitudinal axis of auger portion 82a is parallel to the bottom of the hopper 76 from hopper end 76a to 76b. Inasmuch as the water pressure at the bottom of the hopper 76 decreases from 76b to 76c, due to the depth of the water along the slope of the canal, auger portion 82b is not disposed parallel to the bottom of the hopper 76 but is inclined with respect thereto as seen in FIG. 8 to maintain proper and even concrete "head" in the hopper 76 between 76b and 76c. A conveyor 84, as shown in FIG. 3, extends from adjacent hopper end 76a through frame means 12 and outwardly of the end thereof to end 84b where concrete can be supplied thereon from trucks or the like which drive up beside frame means 12.

Hopper 76 (FIG. 7) is supported from frame means 12 by a series of hydraulic cylinders or jacks 90 to allow hopper 76 to be selectively raised or lowered as necessary. While in most conditions, the hopper 76 will remain at a constant height above the canal floor, it is conventionally necessary to stop a pour of concrete at various intervals. At such a time, the hopper 76 must be raised out of the water to enable concrete therein to be dumped therefrom into the barge 92 as will be described in more detail hereinafter. Further, the hopper and the entire concrete paving assembly must be raised out of the water for servicing or when the apparatus is going to be turned 180° to line the other half of the canal.

Figure 16:
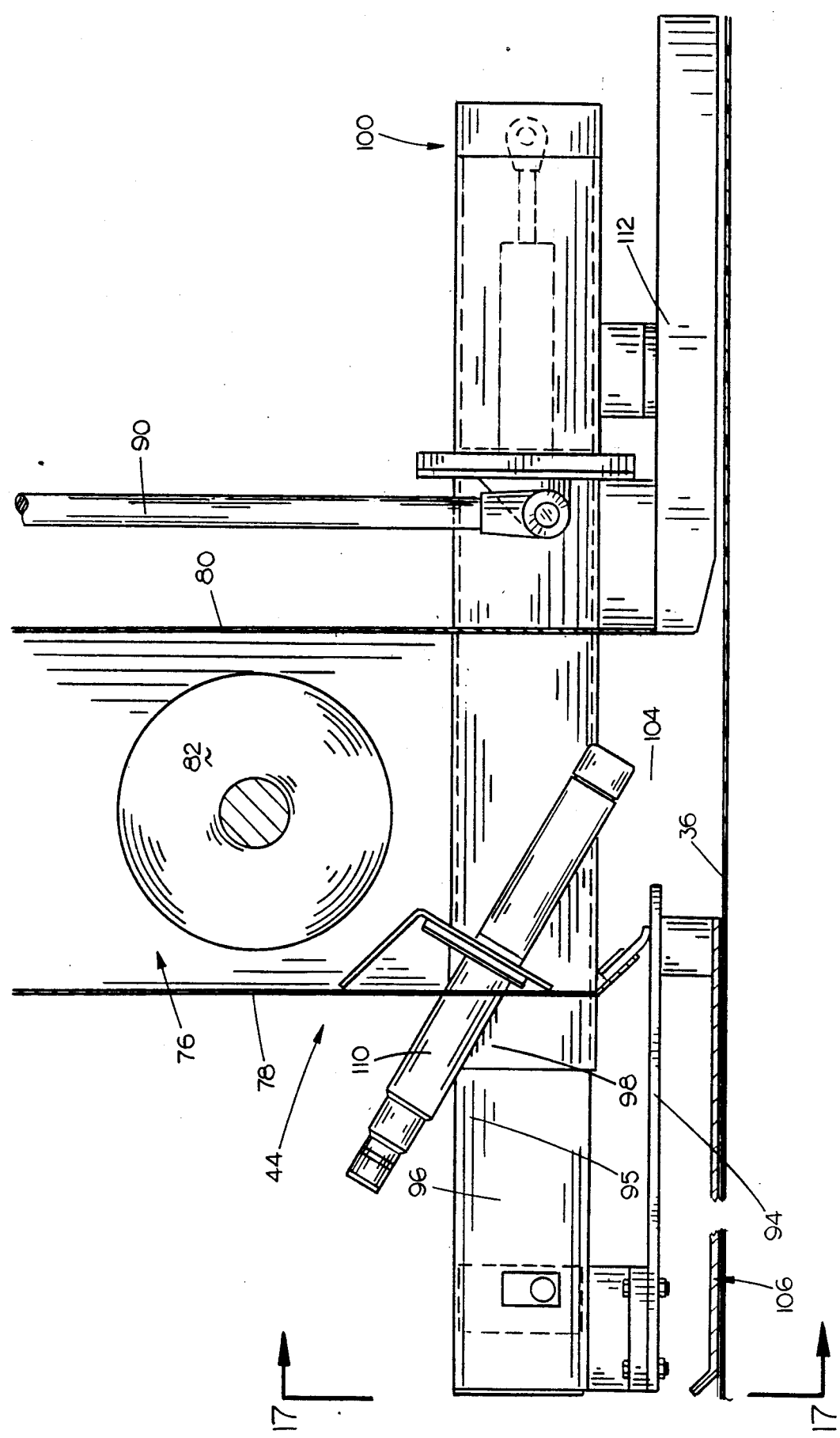
FIG. 16 is a sectional view illustrating the concrete laying apparatus as seen on lines 16—16 of FIG. 8.
Figure 17:
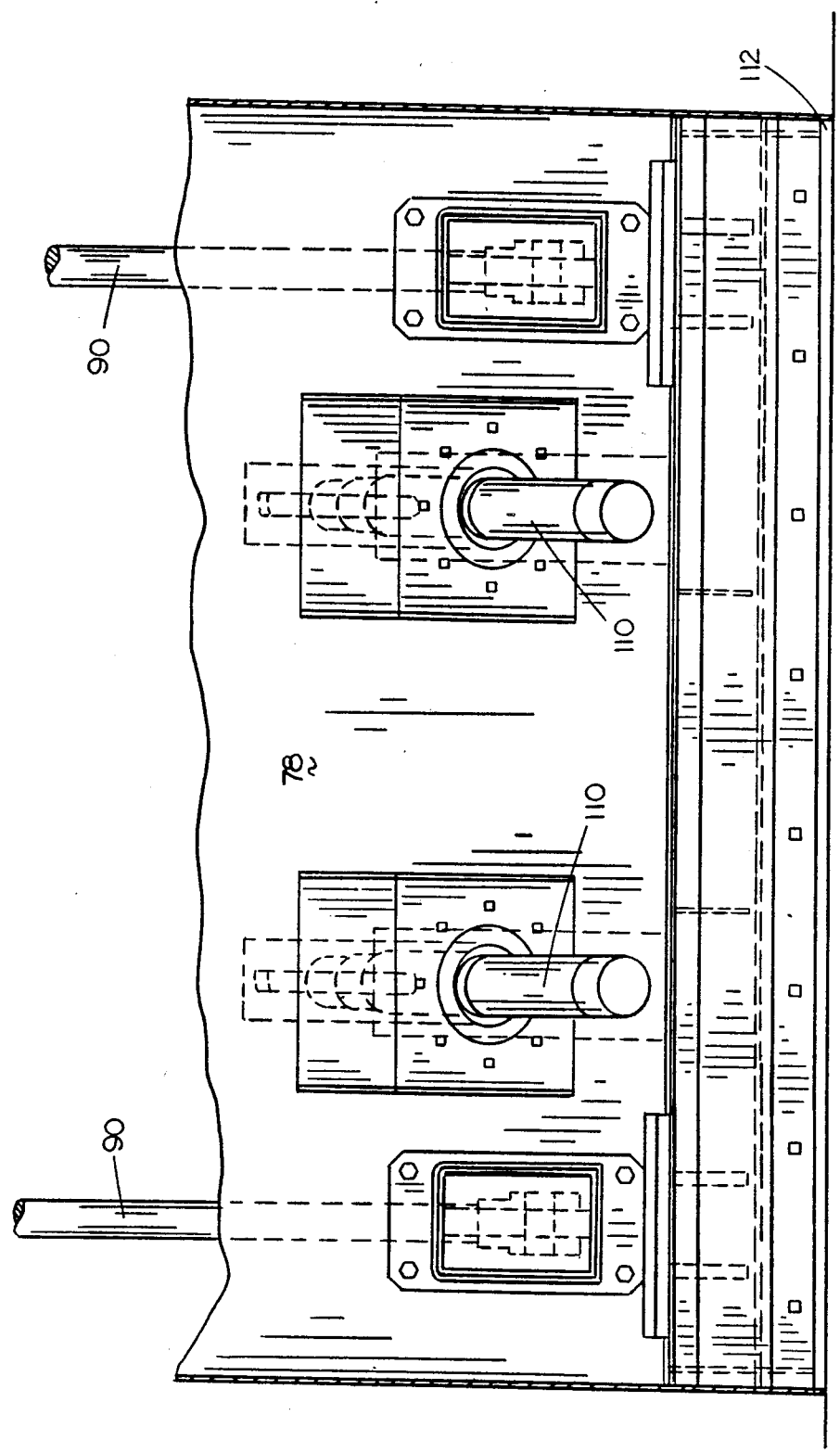
FIG. 17 is a sectional view seen on lines 17—17 of FIG. 16.
Figure 18:
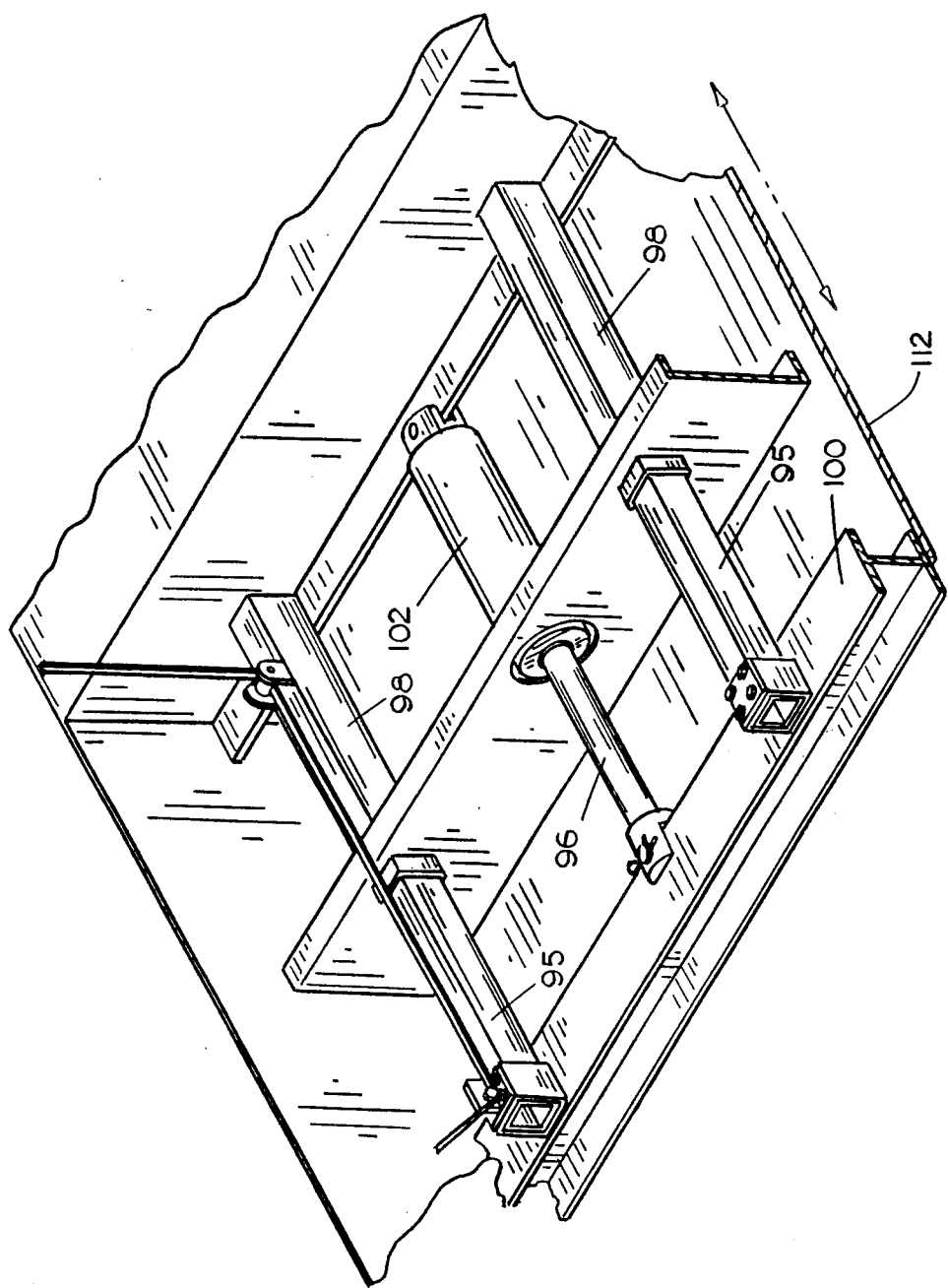
FIG. 18 is a partial perspective view illustrating a portion of the concrete laying apparatus.
Figure 19:
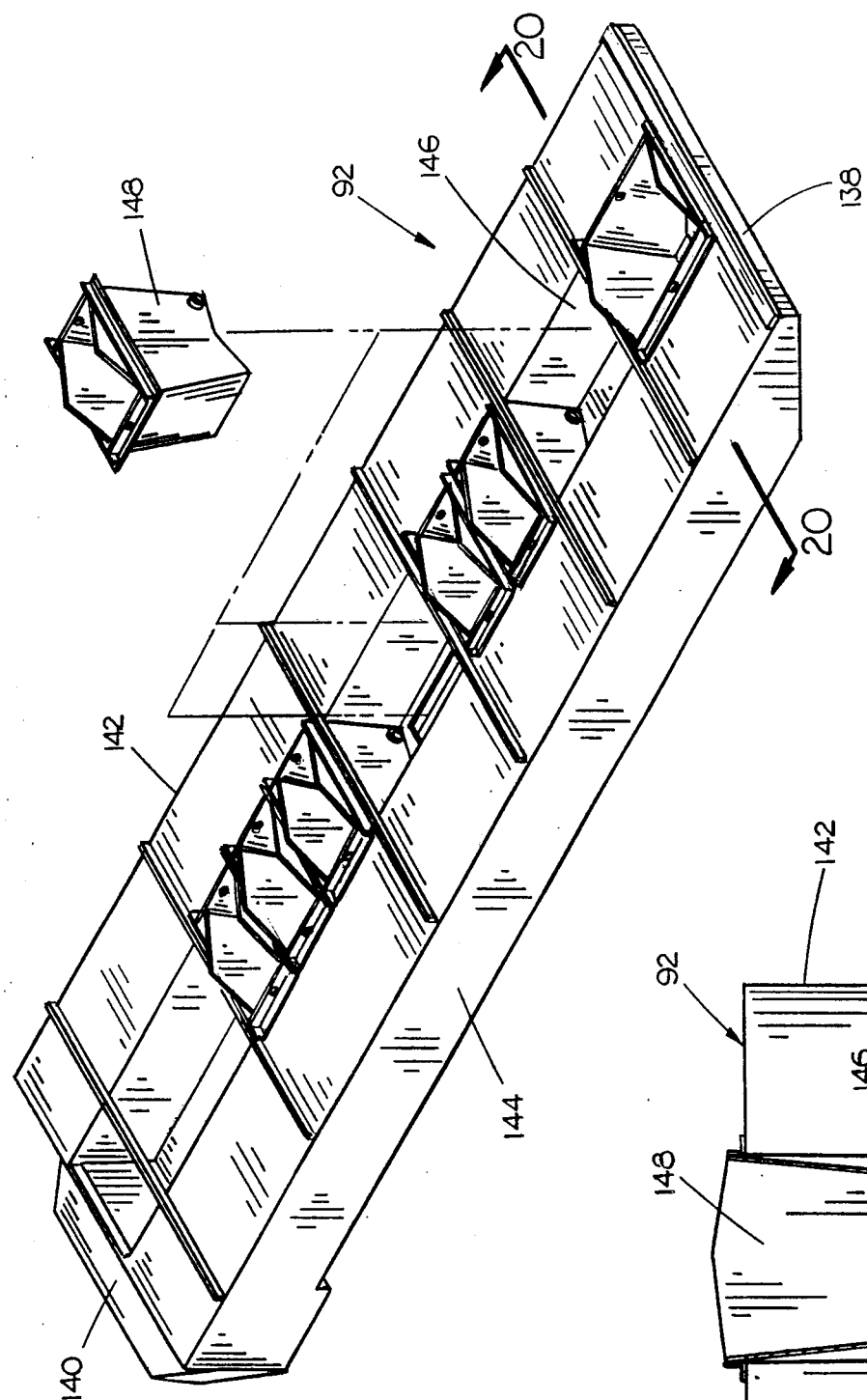
FIG. 19 is a perspective view of the barge which is used to collect excess concrete remaining in the apparatus when the job has been finished or during an interruption in the canal-lining process.
Figure 20:
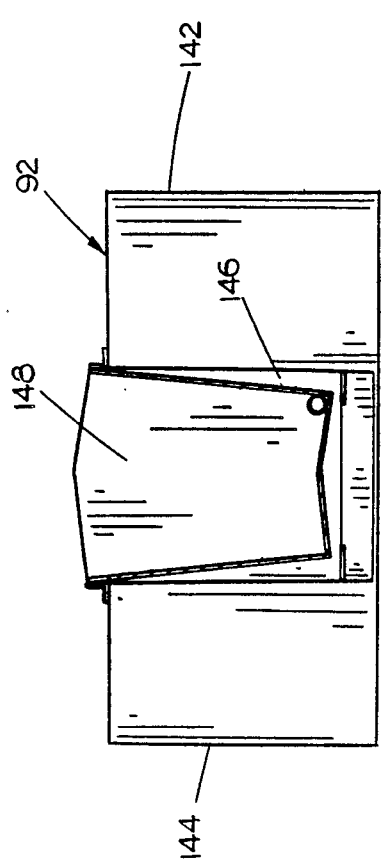
FIG. 20 is a sectional view seen on lines 20—20 of FIG. 19.
Figure 21:
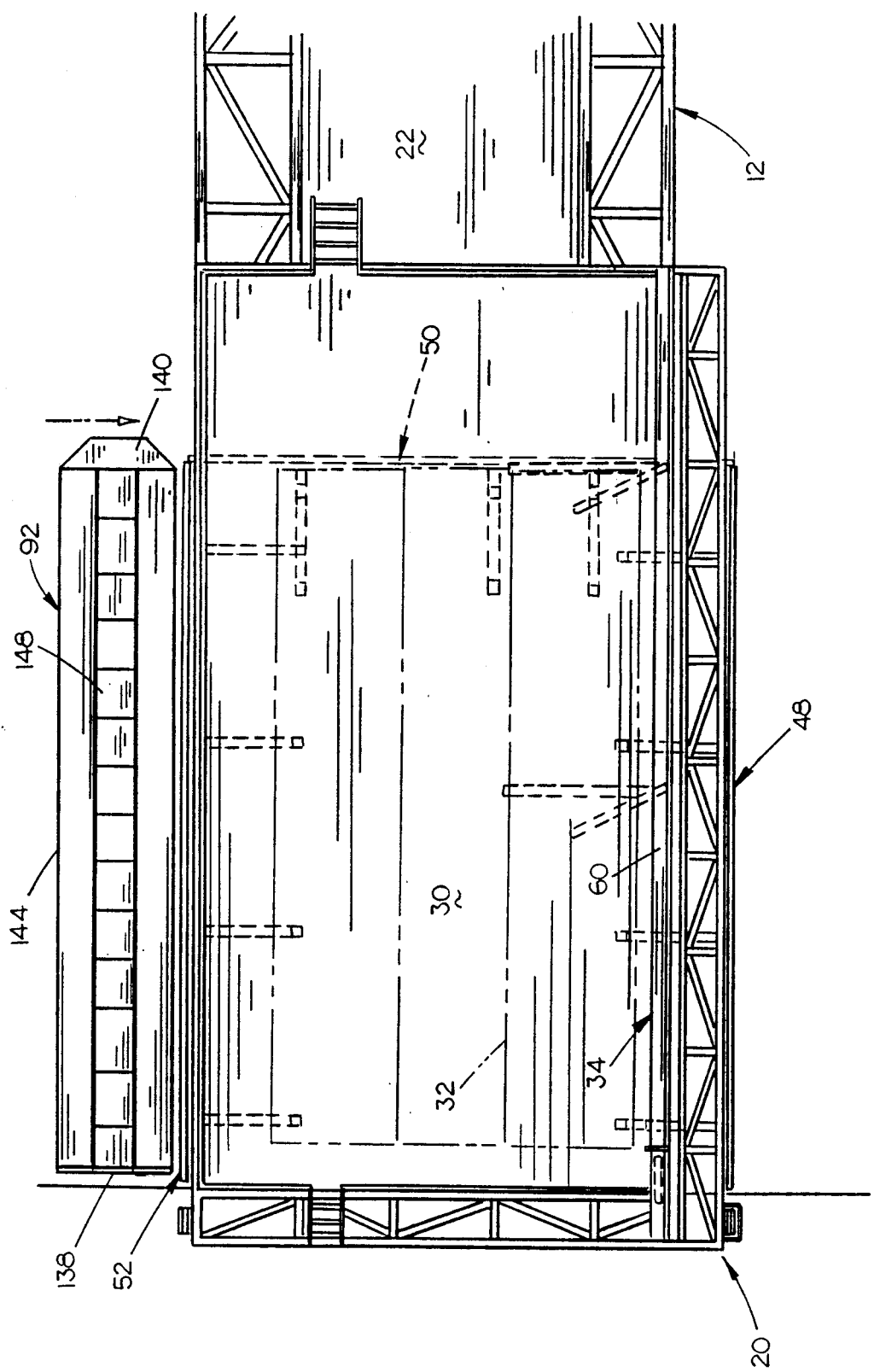
FIG. 21 is a top elevational view illustrating the barge approaching the rearward side of the apparatus so as to enable excess concrete to be dumped therein.

The lower end of hopper 76 is selectively closed by means of a horizontally movable gate 94 which is operatively connected to a plurality of horizontally slidable frame members 95 which are slidably received in tubes 98 secured to the hopper means 76 as seen in FIGS. 16 and 18. One end of the frame members 95 are connected to a beam 100 which is operatively secured to the gate 94 as seen in FIG. 16. Beam 100 has a plurality of hydraulic cylinders 102 operatively connected thereto so that beam 100 may be selectively horizontally moved. The selective horizontal movement of beam 100 causes the gate 94 to be moved relative to the lower open end 104 of hopper 76 to selectively close the same. A shoe or skid 106 is provided below the gate 94 and extends horizontally forwardly therefrom to prevent the soft canal bottom from "boiling up" in advance of the concrete being deposited on the PVC 36. The shoe 106 is suitably supported by the hopper means 76 and is not movable with gate 94 as appears in FIG. 16. A plurality of hydraulic vibrators 110 are provided in the lower end of hopper 76 to vibrate the concrete being placed on the PVC 36. Screed 112 is provided at the lower end of rearward wall 80 to apply the concrete in a uniform layer on the PVC 36. Screed 112 is designed to create the animal escape steps 113 on the sides of the canal as shown in FIG. 9.

Figure 10:
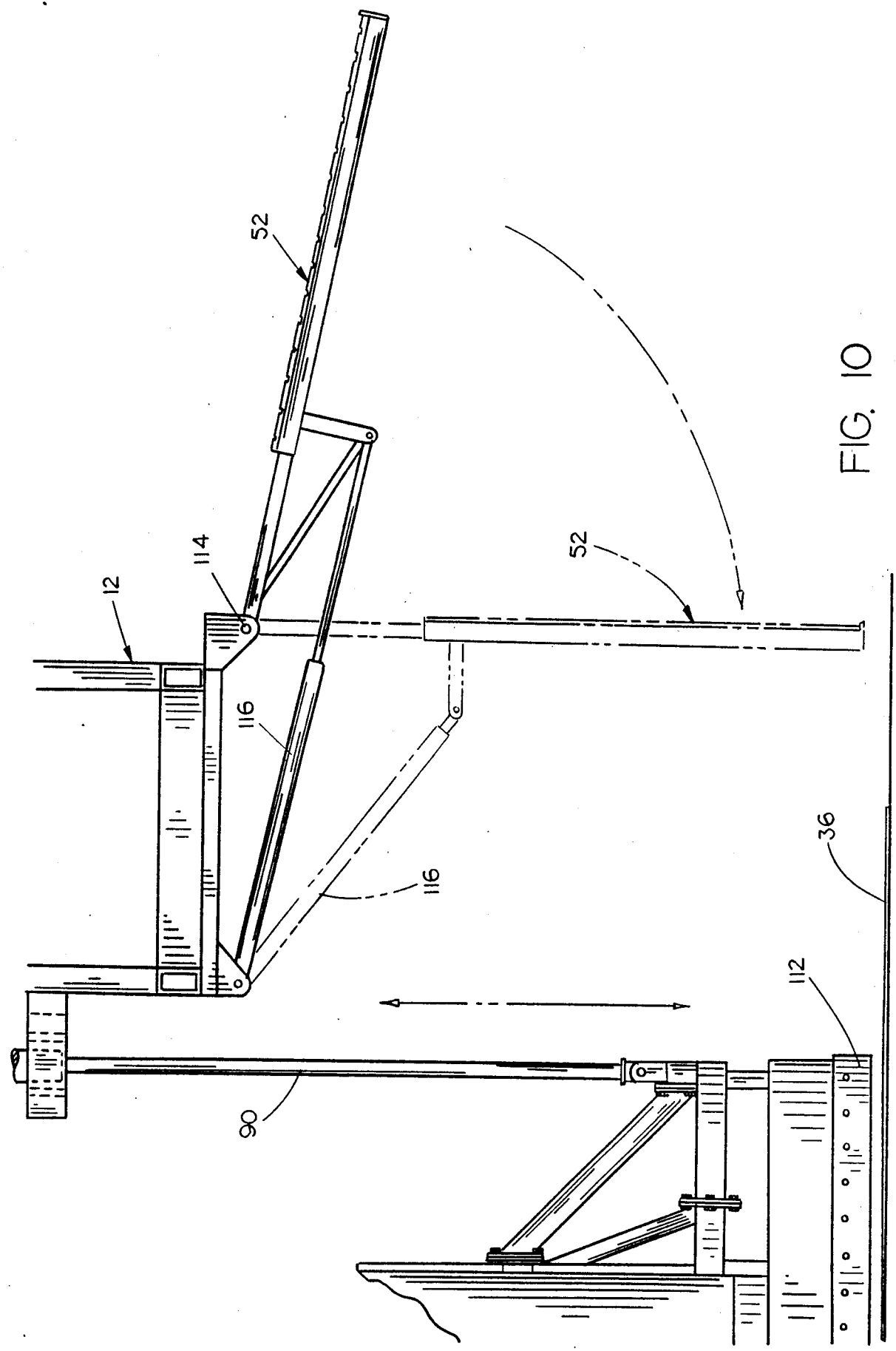
FIG. 10 is an enlarged sectional view seen on lines 10—10 of FIG. 4.

Dam member 52 is pivotally connected at its upper end to frame means 12 at 114. A plurality of hydraulic cylinders 116 are pivotally connected to the frame means 12 and the dam member 52 so that the dam member 52 may be pivotally moved from the inoperative position illustrated by solid lines in FIG. 10 to the position illustrated by broken lines in FIG. 10. The lower end of dam member 52 terminates at a point above the surface of the concrete which has been deposited or laid on the PVC 36.

Dam member 48 is pivotally connected at its upper end to the forward end of frame means 12 at 118. A plurality of hydraulic cylinders 120 permit the dam member 48 to be raised and lowered with respect to the frame means 12 as desired. A plurality of hydraulic cylinders 122 pivotally interconnect the frame means 12 with the dam member 48 to enable the dam member 48 to be pivotally moved the vertical position illustrated in FIG. 11 to the substantially horizontal position illustrated in FIG. 1.

Dam member 50 is pivotally connected at its upper end to frame means 12 at 124 and is provided with a plurality of hydraulic cylinders 126 similar to cylinders 120 to enable dam member 50 to be vertically moved relative to the frame means 12 and the canal bottom. A plurality of hydraulic cylinders 128 pivotally interconnected dam member 50 with frame means 12 to enable the dam member 50 to be pivotally moved between the substantially horizontal position illustrated in FIG. 2 to a vertical operative position. When the dam members 48, 50 and 52 are in their vertical position, they cooperate to shield the lower end of the PVC 36 and the paving apparatus from water current.

Figure 6:
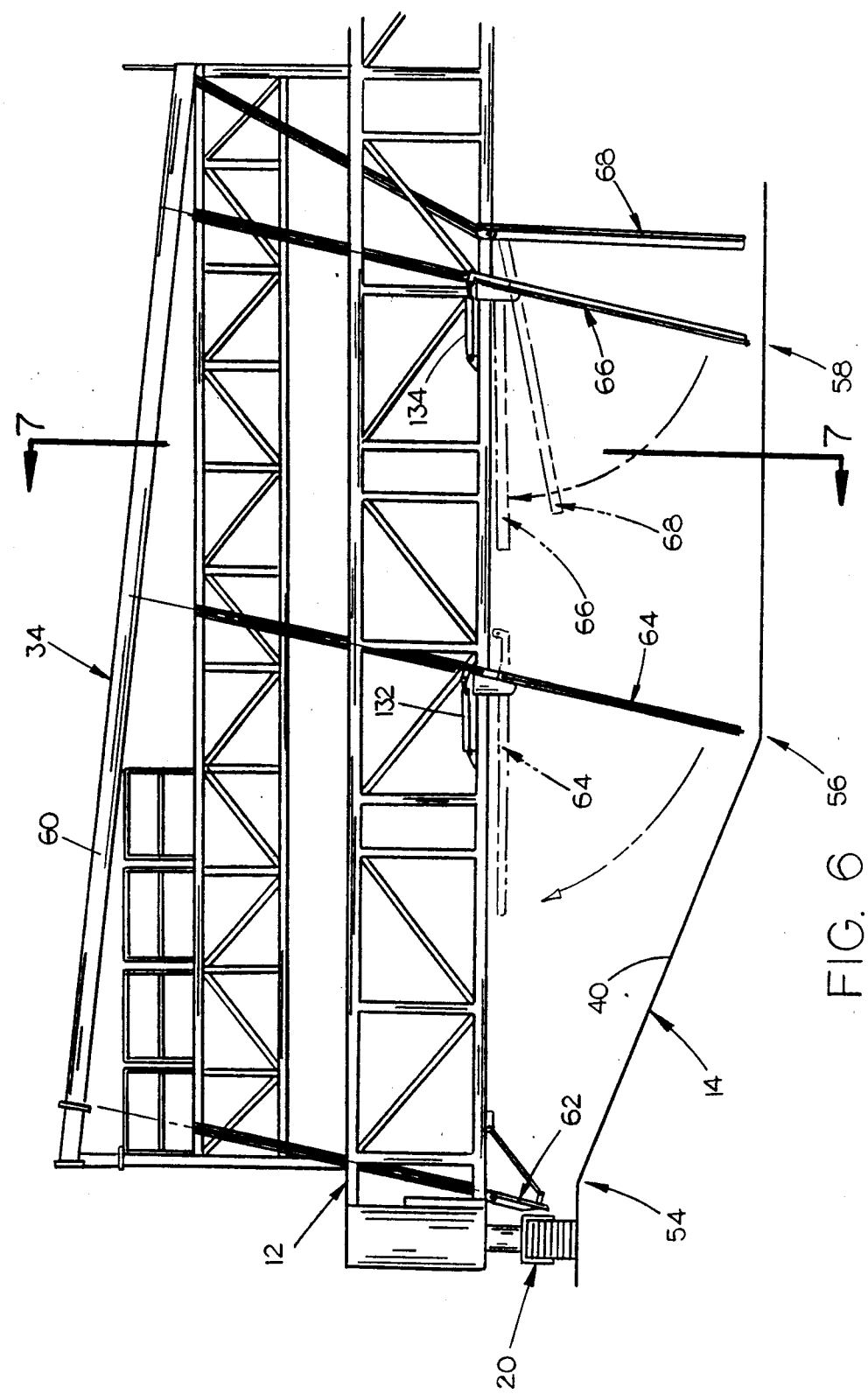
FIG. 6 is a partial front view of the canal-lining apparatus illustrating the pivotal movement of the guide members for the sheet material.
Figure 7:
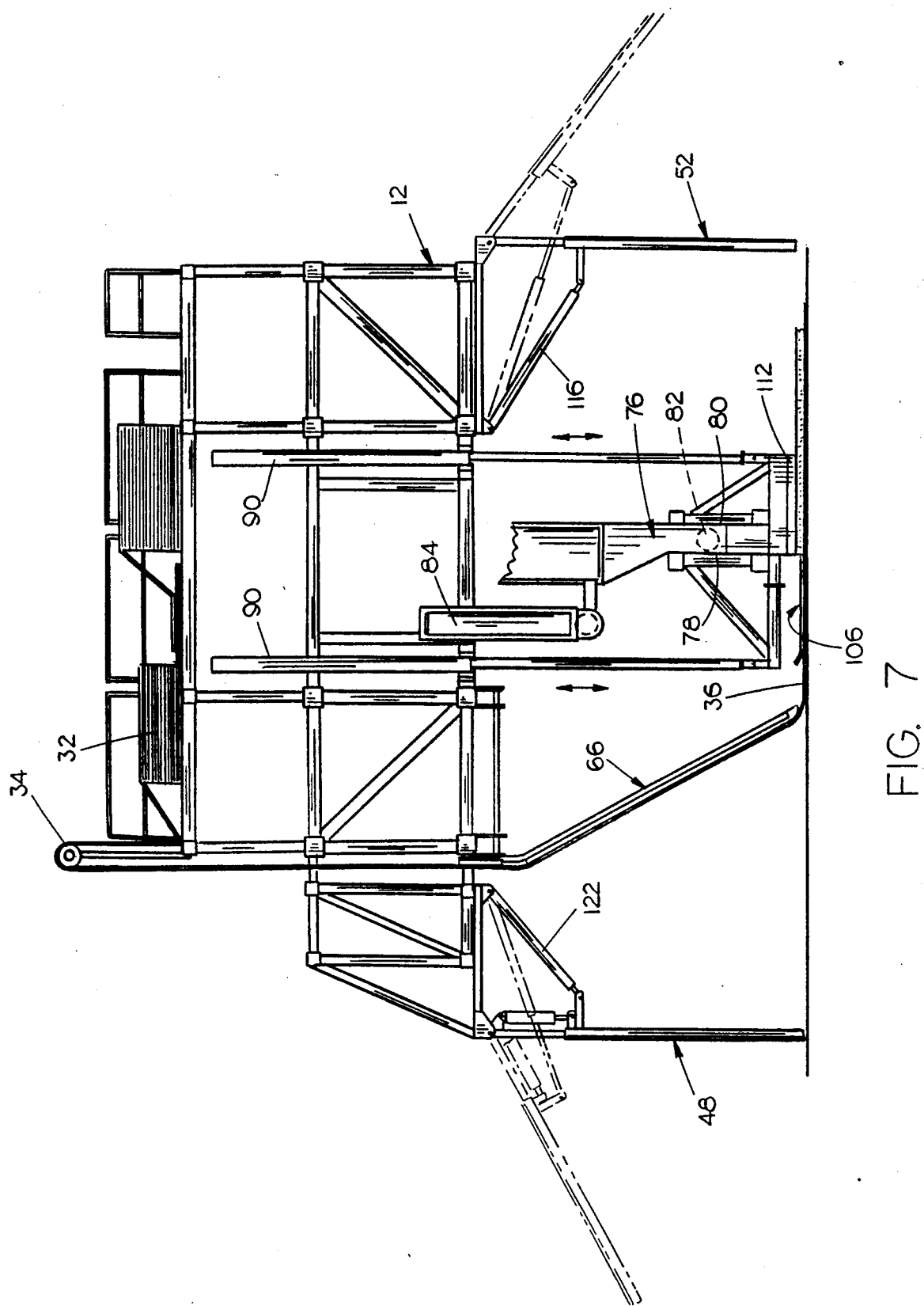
FIG. 7 as seen on lines 7—7 of FIG. 6.

Guide tube 64 is pivotally movable from the position illustrated by solid lines in FIG. 6 to the broken line position by means of hydraulic cylinder 132. Guide tubes 66 and 68 are pivotally movable between the solid line and broken line positions in FIG. 6 by means of a hydraulic cylinder 134.

Barge 92 is provided with an inner end 138, outer end 140, forward end 142 and rearward end 144. Barge 92 includes a plurality of compartments 146 formed therein which are adapted to receive the concrete receptacles 148.

In operation, the current dam members 48, 50 and 52 will prevent the water current in the canal from stretching or deforming the sheet of PVC extending from guide bar 34 to below the concrete hopper 76. On the initial pass, once the PVC sheet 36 has been extended downwardly through PVC guides 62, 64, 66 and 68 and then rearwardly under the concrete hopper 76, the concrete hopper 76 may be charged with concrete and lowered into position over the PVC layer. It should be noted that the PVC layer will extend transversely beyond the layer of concrete at the bottom of the canal, such that upon the return pass of the apparatus, the PVC layer will overlap on itself and the concrete may be poured over the overlapped layer of PVC and abutted against the previously placed concrete layer. It can be seen that this will provide a leak-proof impervious layer beneath the concrete layer. The overlapped PVC layers may also be glued together if desired. During the return pass, guide tube 66 is utilized and guide tube 68 is not utilized.

The lining operation begins upon movement of the apparatus forwardly, with the weight of the concrete and the forward movement of the apparatus pulling the PVC sheet from the PVC stack, and simultaneously forcing any water from under the PVC forwardly of the advancing PVC placement assembly. Because the apparatus blocks only approximately one-half of the canal during operations, the water flow is not significantly affected in the canal.

Upon the return pass, as previously stated, wherein the apparatus is turned around and moving in the opposite direction, the PVC layer will overlap the center, and the concrete hopper will be allowed to pour concrete completely to the edge of the PVC at the center of the canal bottom 38. The concrete will flow against the previously laid concrete layer to form a completely solid concrete lined surface. During the return pass, an adhesive pump discharge is mounted directly forward of the second layer of PVC directly over the previously laid layer of PVC such that the weight of the concrete would cause the adhesive to bond the PVC layers together. The design of the guides 62, 64, 66 and 68 together with the design of the guide bar 60 ensures that the PVC will be positioned in the canal in a substantially wrinkle-free and untensioned fashion due to the fact that all portions of the PVC travel approximately the same distance from the PVC stack to the bottom and sides of the canal.

When the apparatus is to be shut down such as at the end of a shift or if the apparatus is to be turned around for a return pass, it is necessary to remove the concrete from the concrete hopper 76 before the same hardens therein. The concrete hopper 76 is vertically moved upwardly by means of the hydraulic cylinders 90. Barge 92 is then moved into position behind the apparatus and pulled beneath the concrete hopper 76 by means of ropes or the like. The barge 92 is maneuvered until the receptacles 148 are beneath the lower end of the concrete hopper 76. The gates 94 are then opened to permit any concrete in the concrete hopper 76 to flow downwardly therefrom into the receptacles 148. When the concrete has been discharged from the concrete hopper or the concrete paving apparatus, barge 90 is then moved rearwardly relative to the apparatus. A crane is then used to hoist the receptacles 148 from the barge 92 and the concrete is then dumped therefrom.

Whereas the method and apparatus of the present invention has been shown and described in connection with the preferred embodiment thereof, it will be understood that many modifications, substitutions and additions may be made which are within the intended broad scope of the appended claims. Thus, there has been shown and described a method and apparatus for lining a water-filled canal which accomplishes at least all of the above objects.

I claim:

1. The method of lining an irrigation canal having a generally horizontally disposed bottom and side walls extending upwardly and outwardly therefrom, said canal having water present therein, comprising the steps of:
   (1) providing an elongated movable frame means having a length sufficient to span the width of the canal:
   (2) supporting a length of impervious flexible sheet material on said frame means, said sheet material having a width sufficient to cover a portion of the canal;
   (3) moving said frame means along the length of the canal;
   (4) placing said sheet material on a portion of said canal, while water is present in said canal, along the length thereof;
   (5) applying a layer of concrete material over a majority of the sheet material, which was previously positioned in said canal, while water is present in the canal;
   (6) and said sheet material being substantially shielded from the water current in the canal during the placement of the sheet material.

2. The method of claim 1 wherein said sheet material is applied to one of said side walls and a portion of said bottom.

3. The method of claim 1 wherein said sheet material is applied to one of said sides and at least one-half of said bottom.

4. The method of claim 1 wherein said sheet material is placed on said portion of said canal in a substantially wrinkle-free and unstretched condition.

5. A machine for lining a water filled irrigation canal having a generally horizontally disposed bottom and side walls extending upwardly and outwardly therefrom, comprising,
   an elongated frame means having a length sufficient to span the canal,
   means on the opposite ends of said frame means for propelling said frame means along the length of the canal,
   means on said frame means for laying an elongated sheet of flexible, impervious material on a portion of the canal as said frame means is propelled along the canal
   means on said frame means for applying a layer of concrete over a majority of said sheet material as said frame means is propelled along the canal,
   and means for substantially shielding the sheet material from water current as the sheet material is applied.

6. The machine of claim 5 wherein said means for laying said sheet material includes means for applying said sheet material onto at least one of the sides of the canal and a portion of the bottom of the canal.

7. The machine of claim 5 further including means for supporting a supply of the impervious material on the frame means, said means for laying the sheet of impervious material comprising means for causing various portions of the sheet material to travel the same distance from its supply to the placement point on the canal.

8. The machine of claim 5 wherein said means for laying said sheet material includes means for applying said sheet material onto at least one of the sides of the canal and more than one-half of the bottom of the canal.

9. The machine of claim 5 including means for vertically moving said frame means with respect to said means for propelling said frame means.

10. The machine of claim 5 including means for laying said sheet member in a substantially unwrinkled and untensioned condition.

11. The machine of claim 5 including means for substantially shielding the means for applying a layer of concrete from water current as the concrete is applied.

12. The machine of claim 11 including means for substantially shielding the sheet material from water flow as the sheet material is applied.

13. The machine of claim 11 wherein said shielding means comprises a movable dam means mounted on said frame means.

14. The machine of claim 13 wherein said dam means includes a dam member positioned upstream of the means for applying the sheet material and concrete.

15. The machine of claim 14 wherein said dam means includes a dam member positioned downstream of the means for applying the sheet material and concrete.

16. The machine of claim 14 wherein said dam means includes a dam member positioned laterally of the means for applying the sheet material and concrete.

17. The machine of claim 12 wherein said shielding means comprises movable dam members positioned upstream, downstream and laterally of the means for applying the sheet material and concrete.

18. The machine of claim 17 wherein at least some of said dam members are selectively vertically movably mounted on said frame means.

19. The machine of claim 5 wherein said sheet material has elongated first and second rope-like members extending along its opposite side edges respectively and a third rope-like member positioned therebetween, and guide means on said frame means for receiving said rope-like members for positioning the sheet member on said canal in a substantially wrinkle-free and untensioned condition.

20. The machine of claim 5 wherein said means for applying a layer of concrete includes a concrete hopper having an auger means positioned therein for compensating for the different water pressures exerted on the concrete being placed in the canal.

21. The machine of claim 5 wherein said means for applying a layer of concrete includes a selectively vertically movable concrete hopper having a selectively closable lower end, and means for vertically moving said concrete hopper from a paving position closely adjacent the canal to a position thereabove so that the concrete can be removed therefrom at the end of a pour or the like.

22. The machine of claim 21 further including a floatable concrete receiving barge which may be positioned beneath the lower end of said hopper means to permit the removal of concrete from said hopper means.

23. The machine of claim 5 wherein said means for applying a layer of concrete includes a substantially flat shoe means which extends substantially horizontally therefrom over said sheet material closely adjacent the canal bottom for preventing the canal bottom from deforming as the concrete is placed on said sheet material.

* * * * *